US011340956B2

(12) United States Patent
Liu et al.

(10) Patent No.: US 11,340,956 B2
(45) Date of Patent: May 24, 2022

(54) SYSTEMS AND METHODS FOR DYNAMIC PREDICTION AND OPTIMIZATION OF EDGE SERVER SCHEDULING

(71) Applicant: Toyota Motor Engineering & Manufacturing North America, Inc., Plano, TX (US)

(72) Inventors: Yin-Chen Liu, Mountain View, CA (US); BaekGyu Kim, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/018,396

(22) Filed: Sep. 11, 2020

(65) Prior Publication Data
US 2022/0083391 A1    Mar. 17, 2022

(51) Int. Cl.
*G06F 9/50* (2006.01)
*G06F 9/48* (2006.01)
(Continued)

(52) U.S. Cl.
CPC .......... *G06F 9/5072* (2013.01); *G06F 9/4881* (2013.01); *G06F 9/5027* (2013.01);
(Continued)

(58) Field of Classification Search
CPC ... H04L 47/821; H04L 47/822; H04L 47/823; H04L 41/145; H04L 41/147; H04L 41/16;
(Continued)

(56) References Cited

U.S. PATENT DOCUMENTS 6,859,927 B2    2/2005 Moody et al.
8,504,400 B2    8/2013 Purcell et al.
(Continued)

FOREIGN PATENT DOCUMENTS

CN    110460650 A    11/2019
CN    110505165 A    11/2019
(Continued)

OTHER PUBLICATIONS

Sasaki et al., "Vehicle control system coordinated between cloud and mobile edge computing" 2016 55th Annual Conference of the Society of Instrument and Control Engineers of Japan (SICE), Tsukuba, Sep. 2016, pp. 1122-1127.
(Continued)

*Primary Examiner* — Tom Y Chang
(74) *Attorney, Agent, or Firm* — Christopher G. Darrow; Darrow Mustafa PC (57) ABSTRACT

System, methods, and other embodiments described herein relate to improving execution of processing requests by an edge server. In one embodiment, a method includes predicting a number of computing requests from vehicles for execution by the edge server using a prediction solver for a time period that is forthcoming. The prediction solver may predict the number of computing requests using a prediction model selected in association with service constraints of the edge server and information from an additional server. The method also includes determining a request handling scheme using an optimization solver according to the number of computing requests, the service constraints of the edge server, and a service area of the edge server. The method also includes communicating the request handling scheme and a resource schedule to the edge server on a condition that a resources criteria are satisfied for the time period.

20 Claims, 7 Drawing Sheets

(51) Int. Cl.
*H04L 47/70* (2022.01)
*H04L 47/83* (2022.01)

(52) U.S. Cl.
CPC .......... *G06F 9/5077* (2013.01); *H04L 47/821* (2013.01); *H04L 47/822* (2013.01); *H04L 47/823* (2013.01)

(58) Field of Classification Search
CPC ..... H04L 41/5025; H04L 67/10; H04L 67/18; H04L 67/1008; H04L 67/101021
See application file for complete search history.

(56) References Cited

U.S. PATENT DOCUMENTS

| | | | |
|---|---|---|---|
| 8,505,011 | B2 | 8/2013 | Isaka |
| 8,953,613 | B2 | 2/2015 | Davidson et al. |
| 9,042,302 | B2 | 5/2015 | Anthony et al. |
| 10,631,144 | B2 | 4/2020 | Duan |
| 2019/0138934 | A1 | 5/2019 | Prakash et al. |
| 2020/0026575 | A1 | 1/2020 | Bernat et al. |
| 2020/0249039 | A1* | 8/2020 | Lassoued ............... G01C 21/34 |
| 2020/0275313 | A1* | 8/2020 | He ................... H04W 28/0284 |
| 2021/0194988 | A1* | 6/2021 | Chaysinh ............... H04L 41/50 |

FOREIGN PATENT DOCUMENTS

| | | |
|---|---|---|
| WO | 2015090248 A1 | 6/2015 |
| WO | 2017220158 A1 | 12/2017 |
| WO | 2019013102 A1 | 1/2019 |
| WO | 2019018102 A1 | 1/2019 |
| WO | 2019180102 A1 | 9/2019 |
| WO | 2020027548 A1 | 2/2020 |
| WO | 2020057163 A1 | 3/2020 |

OTHER PUBLICATIONS

Xing et al., "Predictive Edge Computing with Hard Deadlines" 2018 IEEE International Symposium on Local Metropolitan Area Networks (LANMAN), Washington, DC, 2018, pp. 13-18.

Ni et al., "Revenue-Maximized Offloading Decision and Fine-Grained Resource Allocation in Edge Network" 2019 IEEE Wireless Communications and Networking Conference (WCNC), Marrakesh, Morocco, 2019, pp. 1-6.

Cui et al., "Task Offloading Based on Lyapunov Optimization for MEC-Assisted Vehicular Platooning Networks," Sensors, vol. 19, Nov. 15, 2019, pp. 1-15.

Jialin Jiao, "Machine Learning Assisted High-Definition Map Creation", 2018 IEEE 42nd International Conference on Computer Software & Applications, pp. 367-373.

* cited by examiner

SYSTEMS AND METHODS FOR DYNAMIC PREDICTION AND OPTIMIZATION OF EDGE SERVER SCHEDULING

TECHNICAL FIELD

The subject matter described herein relates, in general, to an edge server optimization system, and, more particularly, to improving prediction of computing requests to execute on an edge server and optimizing edge server scheduling to improve service coverage or revenue.

BACKGROUND

An intelligent transportation system (ITS) may utilize edge servers located near roads to reduce latency, increase bandwidth, and reduce data costs for vehicles in a service area. A service provider of the ITS may also use edge servers to provide additional services with low latency to vehicles, especially to vehicles with limited computing resources. The service provider may adapt services and resource usage to improve service availability or revenue. In one approach, the ITS may use a distant cloud server to provide the additional services. However, the latency due to the distance between one or more vehicles and the cloud server may reduce the quality or availability of desirable services.

Furthermore, edge servers may get overloaded during a surge of computing requests due to the number of vehicles and types of computing requests exceeding criteria in a service area. In one approach, the edge servers may queue and prioritize the computing requests. However, an ITS with edge servers may sub-optimally process a queued computing request after a vehicle leaves the range of the service area due to rapid movement or speed of the vehicle. Vehicle movement in an ITS may also result in the need for edge servers to handle rapidly changing computing request(s) types and complexity. In certain scenarios, edge server computing requests in a queue may timeout, leaving the computing requests unhandled, lost, or missing.

An overloaded edge server may also reject a computing request(s) or offload the computing request(s) to a cloud server to utilize more resources. However, an edge server rejection of a computing request(s) may waste time since the vehicle is forced to restart the offloading process. Due to latency, the cloud server may also be sub-optimal at handling time-sensitive computing requests.

In addition, an overloaded edge server may adapt a quality of service (QoS) level by degradation to satisfy substantially all the computing requests. For example, the edge server may lower the resolution of a video streaming service. However, service providers seek to improve QoS to provide enhanced services, particularly for safety, mission-critical applications, and video. A service provider may also increase service coverage and revenue through reliable QoS.

SUMMARY

In one embodiment, example systems and methods relate to a manner of improving dynamic prediction and optimization of edge server resources of computing requests or tasks from vehicles in an intelligent transportation system (ITS). In various implementations, current ITS networks and edge servers are sub-optimal at handling computing request(s) overloads from vehicles to provide a satisfactory quality of service (QoS). Accordingly, current edge servers may mishandle or delay processing of computing requests offloaded from vehicles in a service area, particularly during a surge. Computing request(s) processing delays may be especially sub-optimal during rapidly changing time periods due to vehicle movement or changes in the radio environment. Therefore, in one embodiment, an optimization system may select a prediction model for a prediction solver to predict an unknown number of computing requests expected for an edge server(s) to execute for vehicles. The prediction solver may use information from a cloud server(s) and the edge server(s) to predict the number of computing requests for the edge server(s) at a time period that is forthcoming. For example, the prediction solver may adapt according to the cloud server(s) reporting an upcoming special event such as a sporting event, a concert, or rush-hour traffic. In one approach, the prediction model and solver may predict the number of computing requests according to a possible surge of service requests expected from mobile applications to the edge server(s).

Furthermore, an optimization solver may generate a request handling scheme according to the number of computing requests predicted and satisfaction of criteria. The criteria may be current or actual resource demands such that the optimization solver prevents the edge server(s) from using an expired request handling scheme and resource schedule. Concerning scheduling, the optimization system may partition computing requests into subtasks according to the criteria for various servers proximate to the service area of the edge server to distribute the processing load. In one approach, the edge server may use the request handling scheme and vehicle motion to optimize services by adapting data quality. In addition, the edge server may also prioritize and schedule valued data related to safety, automated driving, and infotainment services. In this way, the optimization system predicts computing request(s) loads to optimize the request handling and the resource scheduling for a service provider to improve service coverage or revenue through more reliable edge servers that provide a satisfactory QoS.

In one embodiment, an optimization system for improving the execution of processing requests by an edge server is disclosed. The optimization system includes one or more processors and a memory communicably coupled to the one or more processors. The memory stores a prediction module including instructions that when executed by the one or more processors cause the one or more processors to predict a number of computing requests from vehicles for execution by the edge server using a prediction solver for a time period that is forthcoming, wherein the prediction solver predicts the number of computing requests using a prediction model selected in association with service constraints of the edge server and information from an additional server. The memory also stores an optimization module including instructions that when executed by the one or more processors cause the one or more processors to determine a request handling scheme using an optimization solver according to the number of computing requests, the service constraints of the edge server, and a service area of the edge server. The optimization module may also include instructions to communicate the request handling scheme and a resource schedule to the edge server on a condition that a resources criteria are satisfied for the time period, wherein the resource schedule identifies when to communicate a computing request for offloading to the additional server.

In one embodiment, a non-transitory computer-readable medium for improving execution of processing requests by an edge server and including instructions that when executed by one or more processors cause the one or more processors to perform one or more functions is disclosed. The instructions include instructions to predict a number of computing requests from vehicles for execution by the edge server using a prediction solver for a time period that is forthcoming, wherein the prediction solver predicts the number of computing requests using a prediction model selected in association with service constraints of the edge server and information from an additional server. The instructions also include instructions to determine a request handling scheme using an optimization solver according to the number of computing requests, the service constraints of the edge server, and a service area of the edge server. The instructions also include instructions to communicate the request handling scheme and a resource schedule to the edge server on a condition that a resources criteria are satisfied for the time period, wherein the resource schedule identifies when to communicate a computing request(s) for offloading to the additional server.

In one embodiment, a method for improving execution of processing requests by an edge server is disclosed. In one embodiment, the method predicts a number of computing requests from vehicles for execution by the edge server using a prediction solver for a time period that is forthcoming, wherein the prediction solver predicts the number of computing requests using a prediction model selected in association with service constraints of the edge server and information from an additional server. The method also includes determining a request handling scheme using an optimization solver according to the number of computing requests, the service constraints of the edge server, and a service area of the edge server. The method also includes communicating the request handling scheme and a resource schedule to the edge server on a condition that a resources criteria are satisfied for the time period, wherein the resource schedule identifies when to communicate a computing task for offloading to the additional server.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving prediction of computing requests from vehicles to execute on an edge server(s) and optimizing edge server(s) scheduling are disclosed herein. An optimization system may predict computing requests expected from vehicles in a forthcoming time period for edge server(s) by selecting an optimization model. The optimization system may select a cost based-model according to an edge server(s) and a cloud server(s) resource constraints to improve service coverage or revenue. For example, the optimization system may improve service coverage by offering more service types or higher quality of service (QoS) for a service and increase revenue by delivering higher valued services. The optimization system may generate a request handling scheme for the edge server(s) to provide services using the optimization model according to service coverage or revenue constraints.

Services by an edge server(s) may include assisting a vehicle with automated driving, high-definition (HD) map adaptation, and infotainment services. In one approach, the optimization system may adapt a resource handling scheme and a resource schedule to prioritize valued data related to safety, automated driving, and infotainment services, thereby improving service coverage or revenue. Furthermore, the optimization system may generate the request handling scheme using the computing requests predicted and edge server information. In one approach, the optimization module may also use a formula that maximizes service coverage of the edge server(s) and operator revenue. In this way, the optimization system improves vehicle and edge server(s) resource planning and performance by early resource planning.

In addition, the optimization system may satisfy the resource constraints of a service area and resources criteria for current resource demands during the time period. Resources criteria for current resource demands may be needed to prevent the edge server(s) from using an expired request handling scheme and resource schedule. An edge server(s) using an expired request handling scheme and resource schedule may degrade coverage. Moreover, the optimization system may generate a request handling scheme according to the computing requests expected and server(s) constraints by maximizing a linear formula. In one approach, the formula may factor predicted computing requests, revenue, operator priorities, and resource constraints during the next time period or frame to improve coverage and revenue.

Moreover, the optimization system may communicate the request handling scheme and the resource schedule to the edge server(s) if the resources criteria are satisfied. The optimization system may also determine partitions for a computing request to form into subtasks. A resource management module may distribute the subtasks for execution on a server(s), a vehicle(s), and other devices according to current resource constraints to increase performance and reliability in response to vehicle mobility. Furthermore, the resource schedule may identify when to communicate a computing request(s) for offloading according to the request handling scheme and the resource constraints. In one approach, the optimization system may formulate the resource schedule according to the resource constraints and the resource limitations of the vehicles, an edge server(s), or cloud server(s) in a service area. For example, the resource constraints and the resource limitations may be associated with available communication resources, processing power, vehicle flow, or a task deadline. In this way, the optimization system predicts computing request(s) loads to optimize the request handling and the resource scheduling for a service provider to improve service coverage or revenue of an edge(s) or a cloud server(s).

Figure 1:
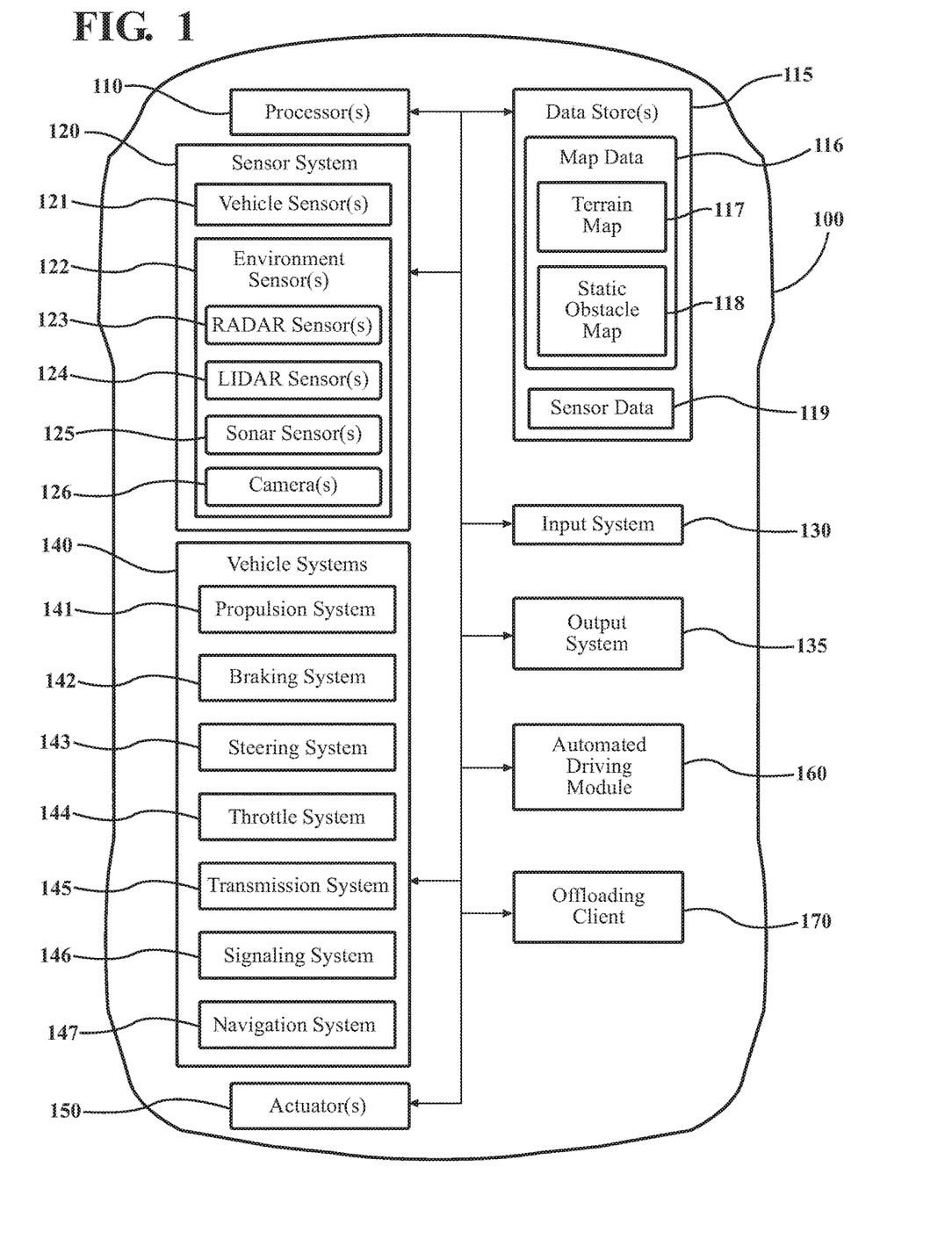
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that benefits from the functionality discussed herein associated with the prediction of computing requests from a vehicle to execute on an edge server(s) and optimizing a resource schedule.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within an edge server(s), a cloud-computing environment, or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figure 2:
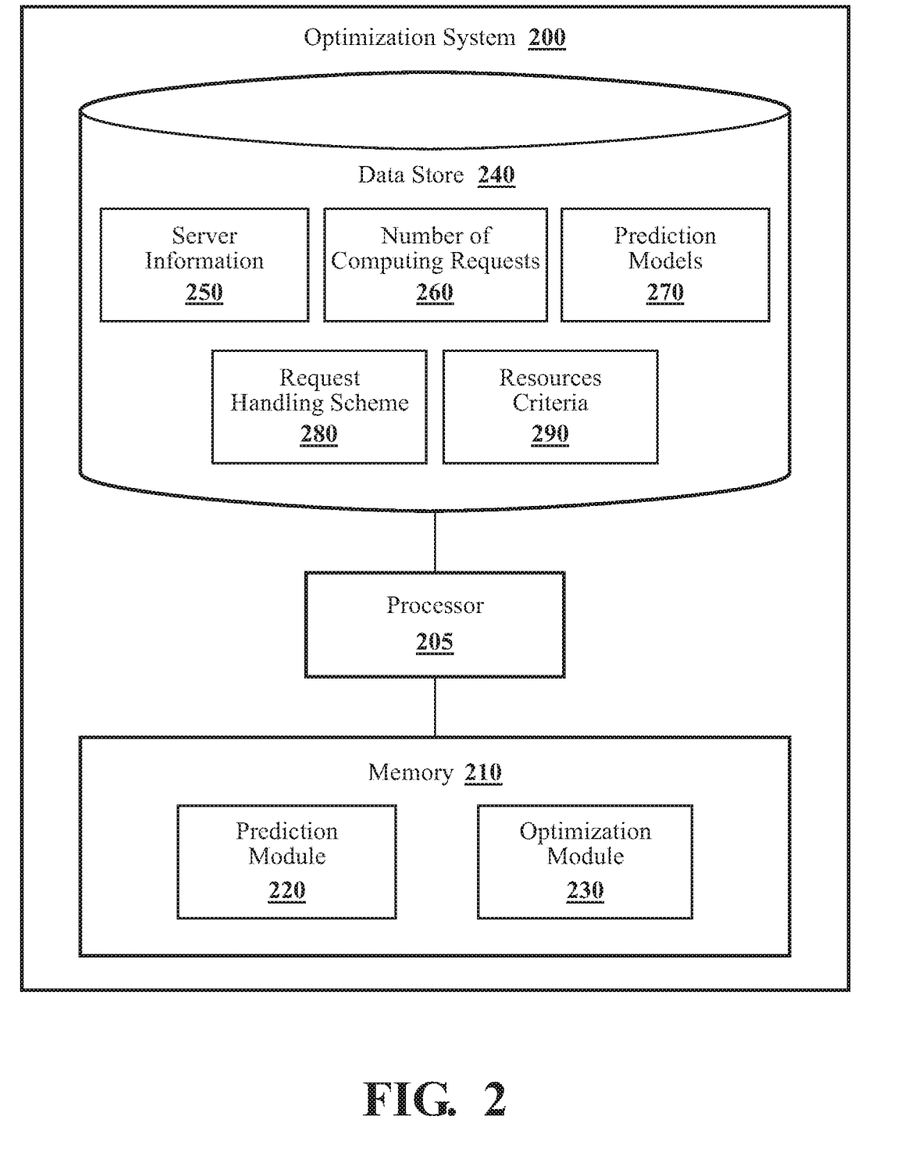
FIG. 2 illustrates one embodiment of an optimization system that is associated with the prediction and the scheduling of vehicle computing requests to execute on an edge server(s) for improving service coverage or revenue.

With reference to FIG. 2, one embodiment of an optimization system 200 is illustrated. The optimization system 200 is shown as including a processor 205. In one embodiment, the optimization system 200 includes a memory 210 that stores a prediction module 220 and an optimization module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 205 cause the processor 205 to perform the various functions disclosed herein.

The optimization system 200 as illustrated in FIG. 2 is generally an abstracted form of the optimization system 200. The prediction module 220 generally includes instructions that function to control the processor 205 to receive data. Moreover, in one embodiment, the optimization system 200 includes a data store 240. In one embodiment, the data store 240 is a database. The database is, in one embodiment, an electronic data structure stored in the memory 210 or another data store and that is configured with routines that can be executed by the processor 205 for analyzing stored data, providing stored data, organizing stored data, and so on. Thus, in one embodiment, the data store 240 stores data used by the modules 220 and 230 in executing various functions. The data store 240 may include the server information 250, a number of computing requests 260, the prediction models 270, a request handling scheme 280, or the resources criteria 290. The server information 250 may include information related to vehicle flow, special events, available services, timing, computing request(s) histories from vehicles, a service quality of service (QoS), resource consumption, service resource consumption, service pricing, available edge server resources, and so on. Special events information may indicate fluctuations in vehicle traffic due to sporting events, concerts, conventions, rush-hour traffic, and so on. A vehicle flow may be information associated with vehicles in a geographic area serviced by a server(s), such as a cloud server(s). For example, vehicle flow information may include the vehicle states on the road, an intersection layout, traffic light positions, stop-n-go profiles, and so on.

Moreover, as further explained herein, the prediction models 270 may be algorithms selected by a prediction solver to predict a number of computing requests 260. For example, the optimization system 200 may predict the number of computing requests 260 received from vehicles in a service area of an edge server(s) at a future time period or timeslot. The prediction models 270 may include discrete algorithms, service polling-based models, neural network (NN) models, and so on. In one approach, the discrete algorithms may be formed according to the server information 250 and resource rules or constraints to improve service coverage or revenue. The optimization system 200 may also form a service polling model according to vehicle(s) usage or driver profiles polled, polling, or surveyed in a service area of an edge server(s).

Concerning NN models, a NN model may be a convolutional neural network (CNN) or deep learning model that uses vehicle flow and request(s) histories to predict the number of computing requests 260. The optimization system 200 may determine the number of computing requests 260 from vehicles associated with the edge server(s) at an upcoming or future time period using CNN. In one embodiment, the prediction model used by the optimization system 200 may be a statistical model such as a regression model that estimates the conditional expectations according to the server information 250. For example, the model may be a polynomial regression (e.g., least weighted polynomial regression), least squares or another suitable approach. In one approach, the NN models may be trained by a service provider according to traffic associated with normal or abnormal constraints. Furthermore, as explained herein, the optimization system 200 may determine the request handling scheme 280 according to the server information 250 and the predicted number of computing requests 260.

Still referring to FIG. 2, the prediction module 220 includes instructions that may cause the processor 205 to predict a number of computing requests 260 for offloading from vehicle 100 and other vehicles. The vehicle 100 and others vehicles may offload the computing requests or tasks for execution to an edge server(s) servicing an area proximate to the vehicles. The prediction module 220 may use a prediction solver for a future, a next, or forthcoming time period. For example, the future time period may be a timeslot, a time frame, a time period, and so on. In one approach, the prediction solver may predict the number of computing requests using one of the prediction models 270 selected in association with service constraints of the edge server(s) and information from an additional server(s). For example, the additional server(s) may include a cloud server, a network server, and so on that provides the server information 250. As explained herein, the prediction models 270 may include discrete algorithms, service polling-based models, NN models, and so on.

Furthermore, the optimization module 230 includes instructions that may cause the processor 205 to determine a request handling scheme 280 using an optimization solver. In one approach, the optimization module 230 may determine the request handling scheme 280 according to the server information 250, the number of computing requests 260, and the service constraints of the edge server(s). For example, the service constraints of the edge server(s) may include service QoS options, resource consumption, service pricing, available resources, and so on.

The optimization module 230 may communicate the request handling scheme 280 and a resource schedule to the edge server(s) by satisfying the resources criteria 290. In one approach, the resources criteria 290 may use current or actual vehicle flow, actual current vehicle conditions, actual driver states, available edge server resources, and so on to determine if the predicted number of computing requests 260 or the request handling scheme 280 satisfy current resource or processing requirements. In this way, the optimization system 200 ensures the applicability of the predicted number of computing requests 260 and the request handling scheme 280 for the current time period.

Moreover, a system may utilize the resource schedule for offloading a computing task to a server(s) other than an edge server(s) for execution. For instance, the resource schedule may identify when to communicate a computing request(s) for offloading to a server(s). In one approach, the optimization system 200 may split or divide a computing request from vehicle 100 associated with substantial data for independent execution by a set of edge servers. The optimization system 200 may split or divide a computing request in association with the predicted number of computing requests 260 or server constraints. In this way, a system may offload and execute data with low latency while optimizing a cost or service QoS objective by considering server(s) and vehicle(s) constraints.

In another example, processing for HD map delivery may be partitioned into an X number of subtasks. Due to vehicle mobility and limited resources, the vehicle 100 may execute a part of the X number of subtasks while an edge server(s) and/or cloud server(s) executes the remainder of subtasks X, thereby improving execution time and coverage by load distribution. Furthermore, the optimization system 200 may further assign the subtasks for the edge server(s) according to vehicle flow in the service area. Examples of vehicle flow information may include the vehicle states on the road, an intersection layout, traffic light positions, stop-n-go profiles, and so on. In this way, the optimization system 200 distributes and balances the load among edge servers while adapting to vehicle mobility.

The server(s) may send executed results back to the vehicle 100. Furthermore, the resource schedule may optimize scheduling by specifying the system used for subtask execution according to the server information 250 or the request handling scheme 280. In one approach, the optimization system may formulate the resource schedule according to the resource constraints and the limitations of the vehicles, an edge server(s), or cloud server(s) in a service area. For example, the resource constraints and the resource limitations may be associated with the available bandwidth, available timeslot resources, the available processing power, the available memory, a distance between edge servers and vehicles, a future vehicle trajectory, data destination information, a task deadline, and so on.

Figure 3:
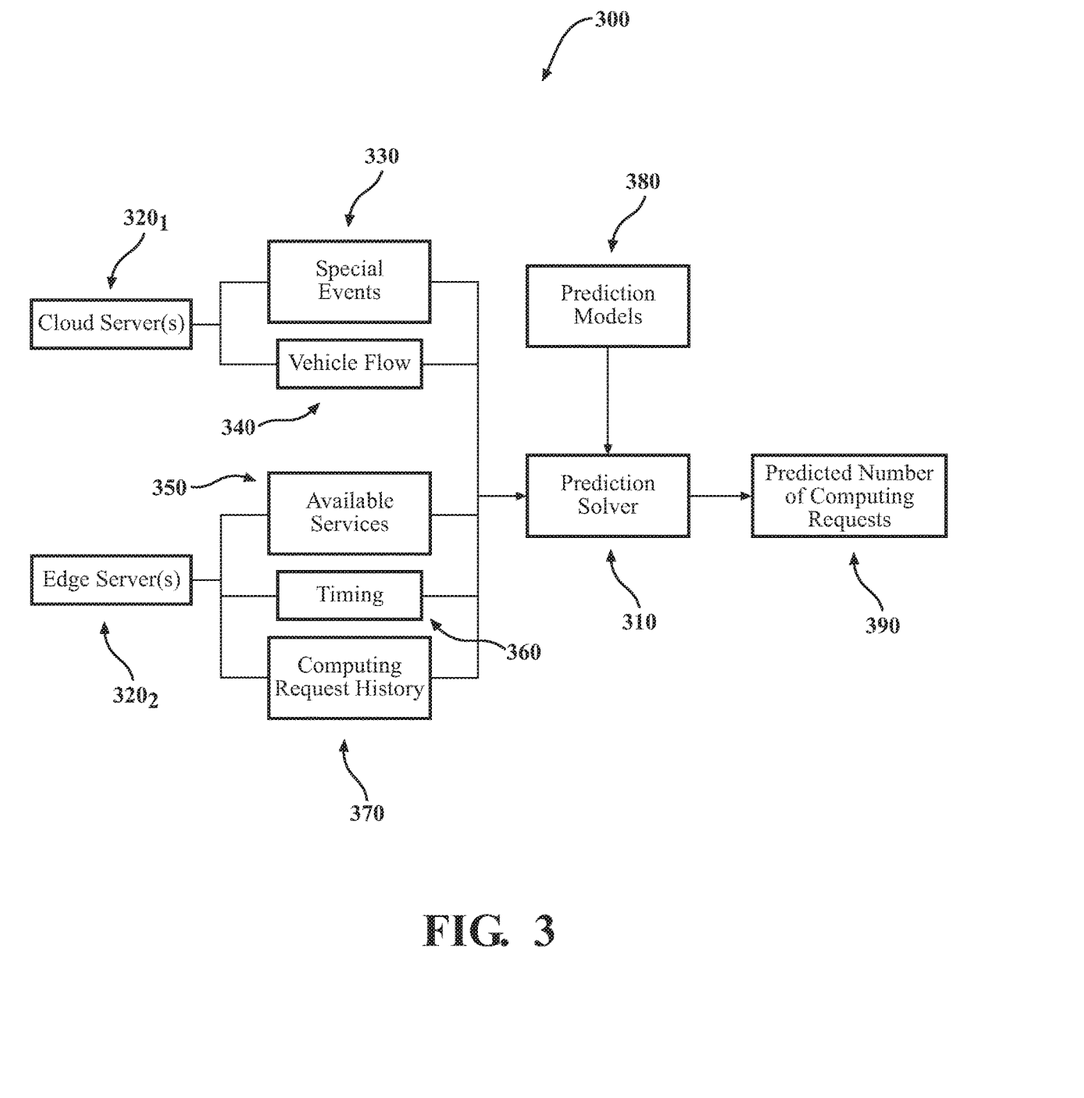
FIG. 3 illustrates one embodiment of a prediction solver that predicts a number of computing requests for offloading according to a request type(s).

FIG. 3 illustrates one embodiment of a prediction solver 300 that predicts a number of computing requests for offloading according to a request type(s). In one approach, the prediction solver 300 may be part of the optimization system 200 and configured to improve the edge server(s) service coverage or revenue. In the examples given herein, an optimization system may improve the edge server(s) service coverage or revenue or service coverage and revenue. The prediction solver 300 may include a prediction solver module 310 that receives information from the cloud server(s) 3201 or the edge server(s) 3202. The cloud server(s) 3201 may report the special events 330, the vehicle flow 340, and so on information. For example, special events information may be fluctuating scenarios such as an upcoming sporting event, a concert, a convention, rush-hour traffic, and so on that substantially changes the profile of a service area of the edge network. Vehicle flow information may include the vehicle states on the road, an intersection layout, traffic light positions, stop-n-go profiles, and so on.

Moreover, the edge server(s) 3202 may report available services 350, the timing 360, the computing request history 370, and so on. The available services 350 may specify processing types associated with the edge server(s) 3202. For example, the edge server(s) 3202 may service automated driving requests, HD mapping and navigation, video coding requests, infotainment requests, media streaming requests, motion planning requests, and so on. Furthermore, the timing 360 may be the current time or related to resource timing schemes associated with the edge server(s) 3202. The timing 360 may also be the next time period, frame, slot, and so on to predict computing requests. In addition, the computing request history 370 may be a history of computing requests by vehicles in an area and related offloading to other servers.

The prediction solver module 310 may use one of the prediction models 380 to predict the number of computing requests 390 according to the information from the cloud server(s) 3201 or the edge server(s) 3202. As previously explained, a prediction model may be a discrete algorithm, a service polling-based model, a NN model, and so on. For example, the NN model may be a CNN or a deep learning model that uses vehicle flow and request(s) histories to predict the number of computing requests expected from vehicles near an edge server at an upcoming or future time period.

Figure 4:
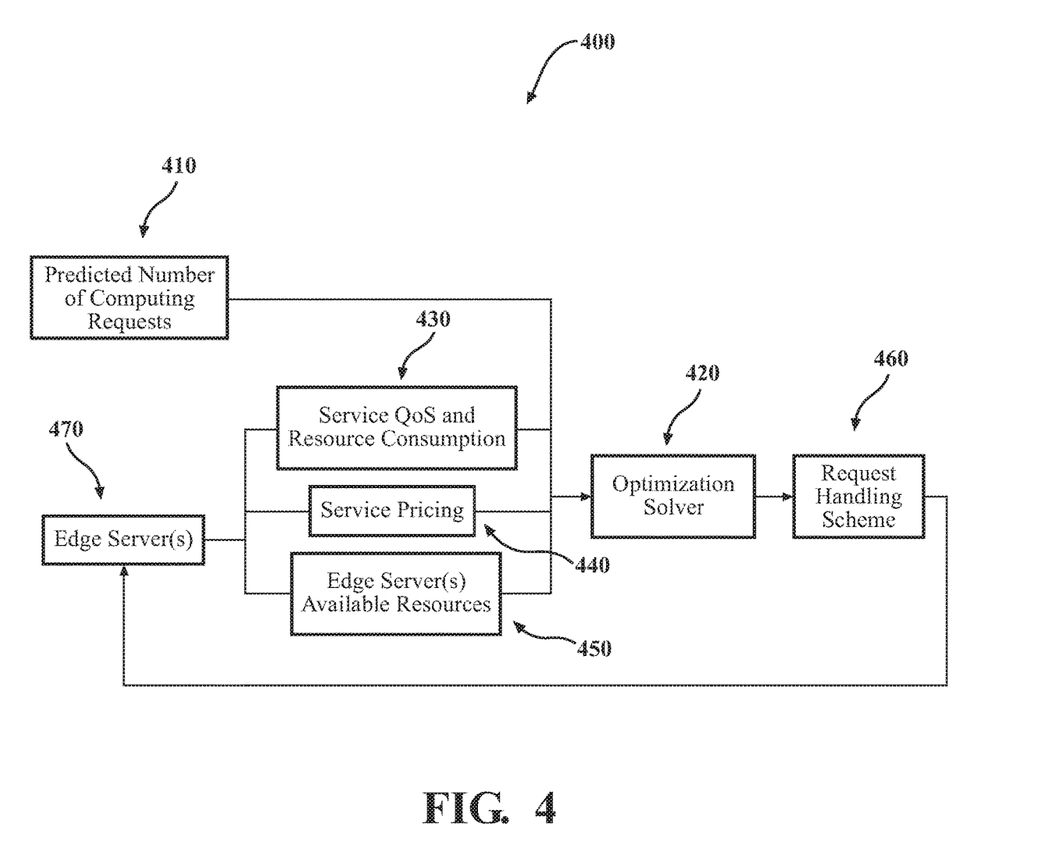
FIG. 4 illustrates one embodiment of an optimization solver that determines a request handling scheme according to a request type(s).

Turning now to FIG. 4, the diagram illustrates one embodiment of an optimization system module 400 that determines a request handling scheme according to a request type(s). For the examples given herein, the prediction solver 300 and the optimization system module 400 may be co-located on the same server or distributed over multiple networked devices. The optimization solver module 420 may receive the predicted number of computing requests 410 from the prediction solver 300. The optimization solver module 420 may also receive service QOS options and resource consumption 430, the service pricing 440, and the edge server(s) available resource 450 information from the edge server(s) 470. The service pricing 440 may relate to the cost of using certain services by the edge server(s) 470. In addition, the edge server(s) available resources 450 information may be the bandwidth and computational capacities of the edge server(s) 470.

The optimization solver module 420 may determine a request handling scheme 460 according to the predicted number of computing requests 410, service QOS options and resource consumption 430, service pricing 440, and the edge server(s) available resource 450 information from the edge server(s) 470. In one approach, as further explained below, the optimization system module 400 or the optimization solver module 420 may use a linear programming solver with linear constraints, such as a cost function, to determine the request handling scheme 460. The optimization solver module 420 may also use a non-linear programming solver with non-linear constraints. In this way, the optimization system may increase performance and revenue by adapting a request handling scheme for an edge server according to the predicted computing requests and the server information in an area.

The optimization solver module 420 may utilize the information in Table 1 for the service QoS options and resource consumption 430. In one approach, the optimization solver module 420 may adapt different service QoS levels according to a determined request handling scheme. In Table 1, the services provided by the edge server(s) 470 may include collision avoidance trajectory planning, camera-based object recognition, an HD map download, infotainment system services, and so on.

TABLE 1

| Service Type | Quality |
| --- | --- |
| Collision Avoidance Trajectory Planning | Time between Waypoints (0.1 sec/ 0.5 sec/1 sec/Reject) |
| Camera based Object Recognition | Frames per second (30 fps/20 fps/ 10 fps/Reject) |
| HD Map for Download | HD map detail level (1 cm/5 cm/ 10 cm/Reject) |
| Infotainment System (e.g. movie, show, etc. | (4K/1080 p/720 p/Reject) |

The quality of the services can vary as illustrated in the "Quality" column. The higher the quality, the greater processing and bandwidth demands are placed on the edge server(s) 470. For example, to maintain coverage for all four services, the edge server(s) 470 may reduce the quality of the services provided to vehicles associated with a service area. Furthermore, an edge server(s) may "Reject" a computing request(s) if the edge server(s) cannot service the computing request(s) at a desired QoS level.

Table 2 illustrates an example of adapting the QoS in Table 1.

TABLE 2

| Service Type | Quality | Exemplary Meaning |
| --- | --- | --- |
| Collision Avoidance Trajectory Planning | 0.5 sec | Generate and return trajectory where time between each waypoint is 0.5 seconds. |
| Camera based Object Recognition | 10 fps | Provide 10 frames per second object recognition. |

TABLE 2-continued

| Service Type | Quality | Exemplary Meaning |
| --- | --- | --- |
| HD Map for Download | 10 cm | Provide HD map with 10 cm level detail. |
| Infotainment System (Download movie) | Reject | Request for downloading movies are currently unavailable |

An optimization system may utilize the Equation (1) to optimize the request handling scheme 460 for the edge server(s) 470. The optimization system may be adapted to optimize server coverage, revenue, or service coverage and revenue. In one approach, an optimization system may also optimize resources according to a service type. Moreover, the optimization system may use Equation (1) to prioritize service coverage (e.g. all available services offered) improvement and then improve revenue.

$$\max_P N_{cover} + N_{rev} \cdot K \qquad \text{Equation (1)}$$
$$\text{s.t.} \quad 1) \; R_{tran} \leq \overline{R}_{tran}$$
$$2) \; R_{proc} \leq \overline{R}_{proc}$$

In Equation (1), P may be the available service options and $N_{cover}$ the total number of requests not selecting the deny option. Furthermore, $N_{rev}$ may be the total revenue and K a variable or factor adapted to prioritize service request coverage. An optimization system may maximize Equation (1) such that the total consumer data transfer capacity $R_{tran}$ is less than or equal to $\overline{R}_{tran}$ the total data transfer capacity the edge server(s) 470 can provide during the next time period or frame. An optimization system may also maximize Equation (1) such that the total consumed processing capacity $R_{proc}$ is less than or equal to the total processing capacity the edge server(s) 470 can provide during the next time period or frame.

Figure 5:
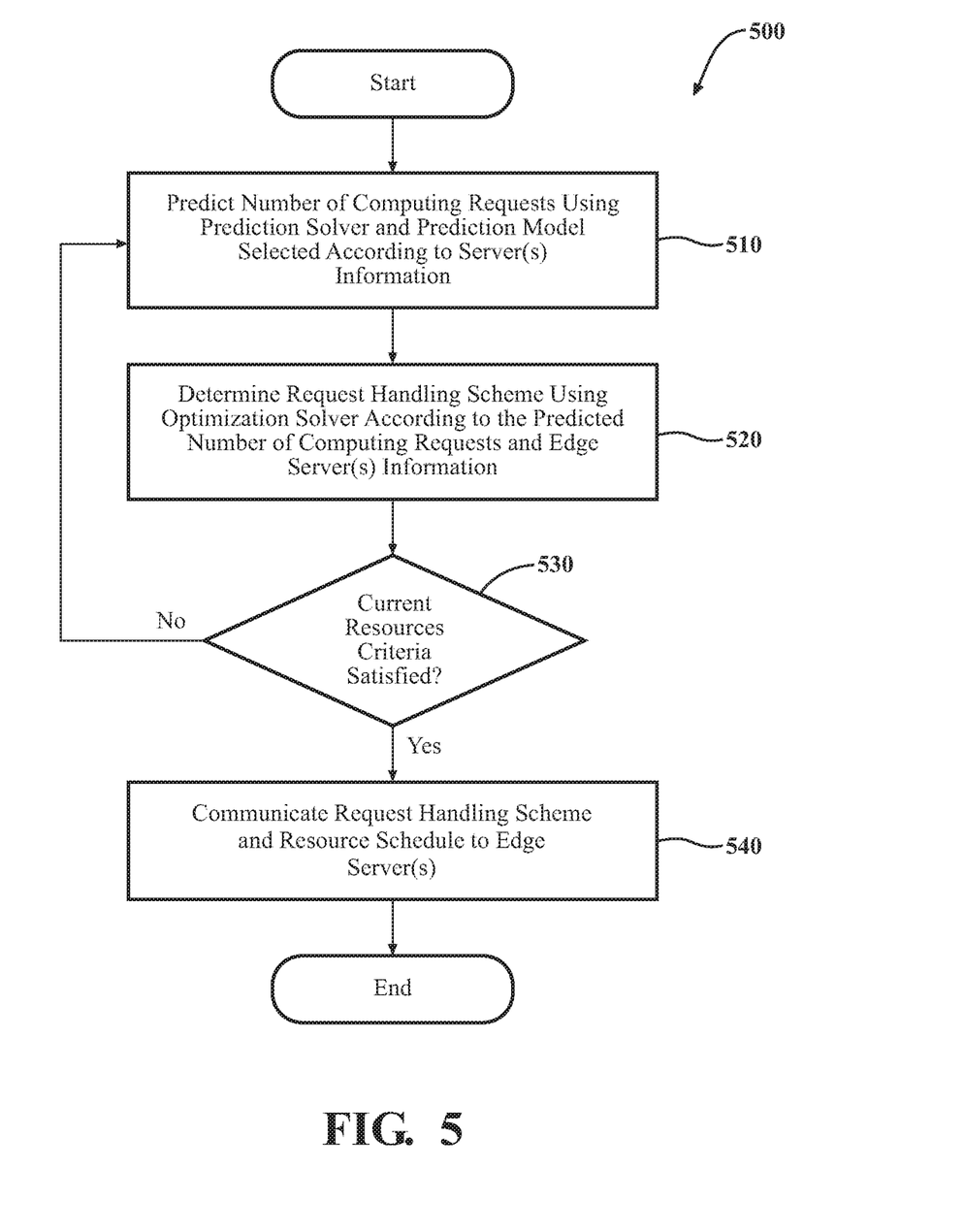
FIG. 5 illustrates one embodiment of a method that is associated with the prediction and the scheduling of computing requests from vehicles in an area to execute on an edge server(s).

Turning now to FIG. 5, additional aspects of the optimization system 200 will be discussed. FIG. 5 illustrates a flowchart of a method 500 that is associated with the prediction and the scheduling of computing requests from vehicles in an area to execute on an edge server(s). Method 500 will be discussed from the perspective of the optimization system 200 of FIG. 2. While method 500 is discussed in combination with the optimization system 200, it should be appreciated that the method 500 is not limited to being implemented within the optimization system 200 but is instead one example of a system that may implement the method 500.

In FIG. 5, at 510 the optimization system 200 or the prediction module 220 predicts the number of computing requests 260 using the prediction solver module 310. The prediction solver module 310 may use a prediction model selected according to the server information 250 received from an edge server(s) or a cloud server(s). The prediction solver module 310 may also use the server information 250 to predict the number of computing requests 260. As previously explained, the server information 250 may include information related to a vehicle flow, special events, available services, timing, computing request(s) histories, service QoS options, resource consumption, service resource consumption, service pricing, edge server(s) available resources, and so on. In addition, a prediction model may be an algorithm used to predict the number of computing requests 260 received from vehicles in a service area of an edge server at a future time period or frame. As previously explained, the prediction model may be a discrete algorithm, a service polling-based model, a NN model, and so on.

At 520, the optimization system 200 or the optimization module 230 determines a request handling scheme 280 using the optimization solver module 420, the predicted number of computer requests 260, and edge server information. In one approach, as previously explained, the optimization system 200 or the optimization solver module 420 may use a linear programming solver with linear constraints, such as a cost function, to determine the request handling scheme 280. For example, the optimization module 230 may determine the request handling scheme 280 according to Equation (1). The optimization solver module 420 may also use a non-linear programming solver with non-linear constraints. In addition, the optimization module 230 may determine the request handling scheme 280 using edge server information that includes a QoS, QoS levels, resource consumption, service resource consumption, service pricing, available edge server resources, and so on.

At 530, the optimization system 200 or the optimization module 230 determines the satisfaction of the resources criteria 290. As previously explained, the resources criteria 290 may use actual vehicle flow, actual vehicle conditions, actual driver states, available edge server(s) resources, and so on to determine if the request handling scheme 280 and resource schedule satisfy current processing or resource requirements. In this way, the optimization system 200 ensures the applicability of the request handling scheme 280 and the resource schedule for the current time period for more reliable service. If the resources criteria 290 are unsatisfied, the optimization system 200 may again predict the number of computing requests 260 to optimize a subsequent time period or frame.

At 540, if the optimization system 200 determines the satisfaction of the resources criteria 290, the optimization system 200 communicates the request handling scheme 280 and the resource schedule to the edge server(s). The edge server(s) may use this information to optimize coverage or revenue in a current, a future, a next, or forthcoming time period. For example, the future time period may be a timeslot, a time frame, a time period, and so on. As previously explained herein, the resource schedule may identify when to communicate a computing task for offloading to the edge server(s) or other server(s) for execution.

Figure 6:
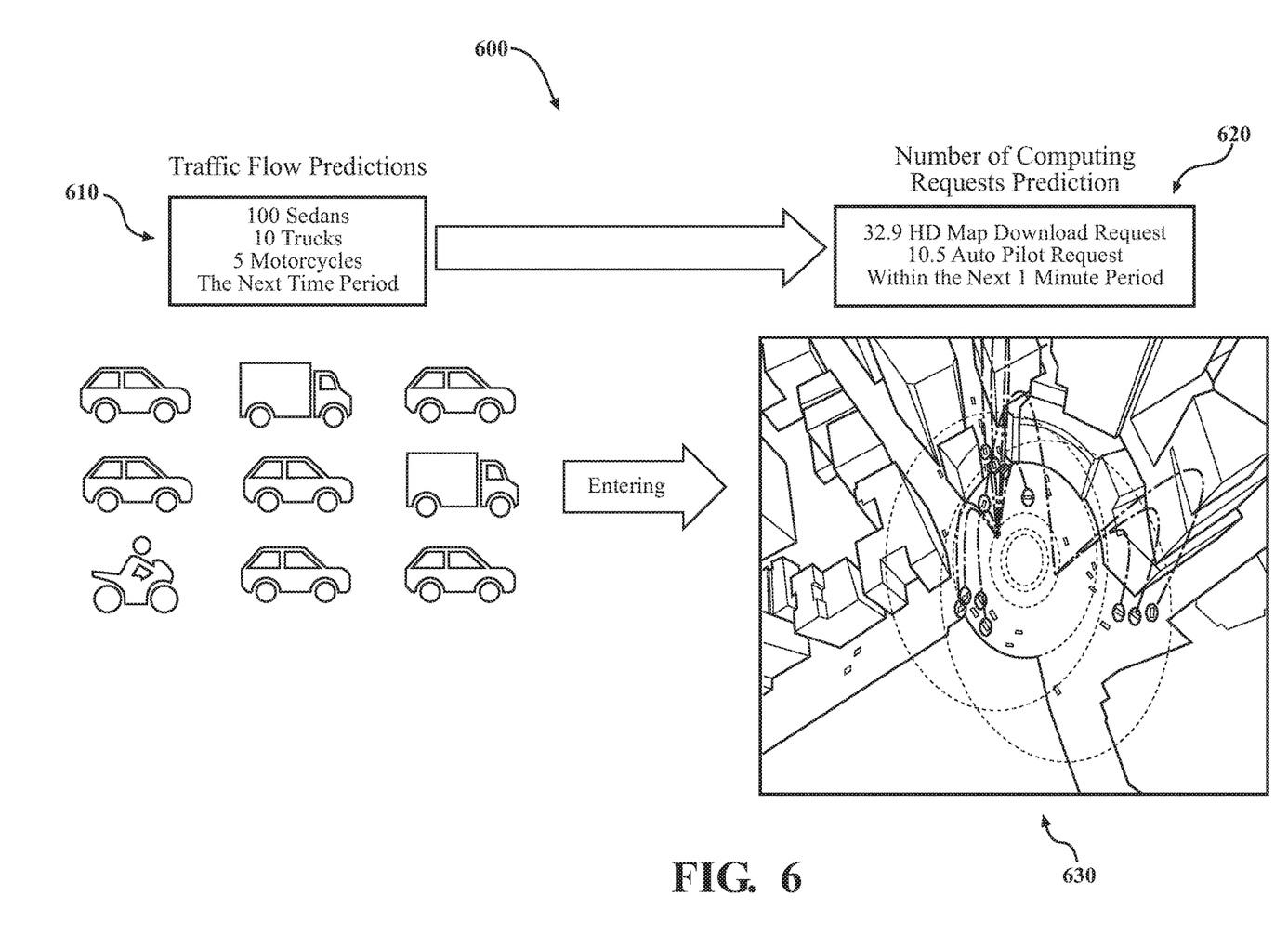
FIG. 6 illustrates an example of predicting computing requests to execute on an edge server(s).

FIG. 6 illustrates an example 600 of predicting computing requests to execute on an edge server(s). A system may predict traffic or vehicle flow 610 as 100 sedans, 10 trucks, and 5 motorcycles in the next time period, frame, slot, and so on. In example 600, the edge server(s) may provide the two services of HD map requests and automated driving requests in the service area 630. A prediction solver may determine processing related to approximately 32.9 HD map download requests and 10.5 automated driving requests within the next one-minute time period for the number of computing requests 620.

An optimization system may generate the following results for example 600 using Equation (1) according to the number of computing requests prediction. The vehicle 100 using the offloading client 170 and other vehicles may send requests to download a HD map. The variable $N_{cover}$ may be maximized followed by $N_{rev}$ using the QoS option 10 centimeters (cm) level for downloading the HD map. A 10 cm level may represent a HD map with a 10 cm level of detail. Also for the optimization, a total consumer data transfer capacity may be 3290 Mb and a total consumed processing capacity may be 13.16 G cycles. In this scenario, the optimization results is a total revenue $N_{rev}$ of $32.9.

In another example, the optimization system may determine a total consumer data transfer capacity of 105 Mb for a position tracking service associated with a collision avoidance trajectory plan of the vehicle 100 and others in example 600. The vehicle 100 may use the offloading client 170 to send a computing request(s) associated with the position tracking service. For the optimization, the total consumed processing capacity may be 31.5 G cycles. In this scenario, the optimization results is a total revenue $N_{rev}$ of $105.

Figure 7:
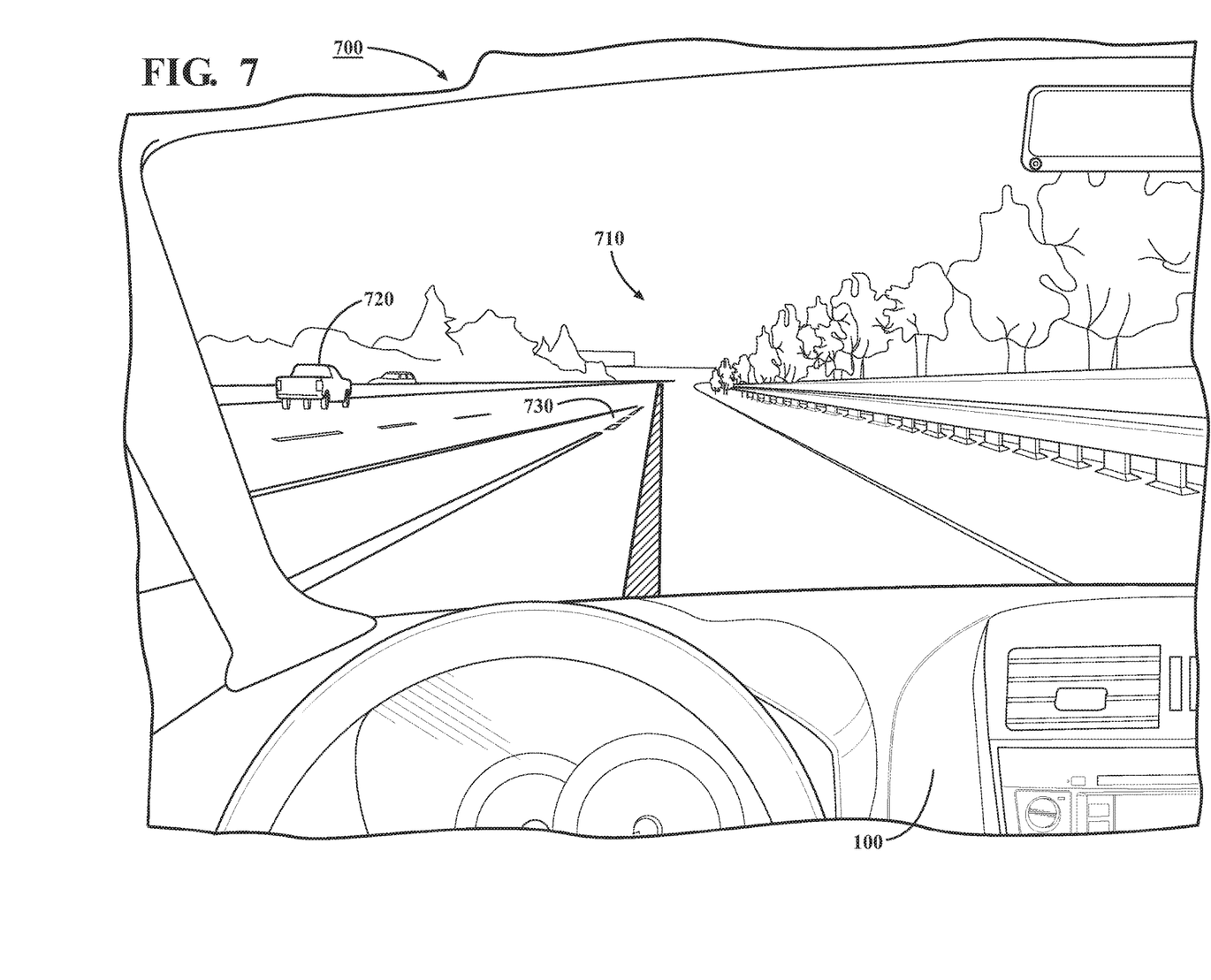
FIG. 7 illustrates a vehicle driving environment including vehicles that request an edge server(s) to execute computing requests.

Now turning to FIG. 7, the diagram illustrates a vehicle driving environment 700 including vehicles that request an edge server(s) to execute computing requests. In FIG. 7, an optimization system may receive computing requests from vehicle 720 and vehicle 100. The driving environment 710 may include the vehicle 100 and the vehicle 720 traveling on the expressway 730. In one approach, the optimization system may predict a number of computing requests or tasks and optimize an edge server(s) resources for the vehicle 720 and the vehicle 100 according to the predicted number of computing requests. In this way, as explained herein, the optimization system may improve service coverage and operator revenue by predicting the number of computing requests and optimize a resource schedule for an edge server(s) using a request handling scheme. Furthermore, the optimization system may distribute computation by dividing a computing request into subtasks for execution on multiple edge services according to the resource schedule.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an autonomous or automated vehicle. As used herein, automated vehicle or "autonomous vehicle" refers to a vehicle that is capable of operating in an autonomous mode (e.g., category 5, full automation). "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application specific integrated circuit (ASIC), a microprocessor, etc. The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As previously explained, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110 and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140 and, thus, may be partially or fully autonomous as defined by the society of automotive engineers (SAE) 0 to 5 levels.

The processor(s) 110 and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110 and/or the automated driving module(s) 160 can control the direction and/or speed of the vehicle 100. The processor(s) 110 and/or the automated driving module(s) 160 can cause the vehicle 100 to accelerate, decelerate ( ) and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 can be configured to determine travel path(s), current autonomous driving maneuvers for the vehicle 100, future autonomous driving maneuvers, and/or modifications to current autonomous driving maneuvers. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ and so on and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An optimization system for improving execution of processing requests, comprising:
one or more processors;
a memory communicably coupled to the one or more processors and storing:
a prediction module including instructions that when executed by the one or more processors cause the one or more processors to:
predict, using a prediction solver, a number of computing requests associated with offloading computation tasks from vehicles for execution by an edge server for a time period upcoming, wherein the prediction solver selects a prediction model from a plurality of learning models according to attributes of the edge server including service resources and information from an additional server as inputs; and
an optimization module including instructions that when executed by the one or more processors cause the one or more processors to:

determine, using an optimization solver according to a maximization formula, a request handling scheme that prioritizes remote execution of vehicle data according to the number of computing requests received from the prediction solver, the service resources, and a service area of the edge server; and communicate the request handling scheme and a resource schedule to the edge server on a condition that a resources criteria are satisfied for the time period, wherein the resource schedule identifies when to communicate a computing request for offloading to the additional server and when a first subtask partitioned from the computing request is executable on the edge server and a second subtask partitioned from the computing request is executable on the additional server according to the resources criteria.

2. The optimization system of claim 1, wherein the optimization module further includes instructions to partition the computing request according to satisfaction of the resources criteria and vehicle flow in the service area.

3. The optimization system of claim 2, wherein the prediction module further includes instructions to select the prediction model according to a substantial number of the computing requests associated with an event for the time period, wherein the prediction model is selected to satisfy one of service coverage and operator revenue.

4. The optimization system of claim 1, wherein the optimization module further includes instructions to adapt the optimization solver to determine the request handling scheme to satisfy the number of computing requests at the time period according to expected vehicle movement in the service area of the edge server to satisfy one of service coverage and operator revenue.

5. The optimization system of claim 1, wherein the vehicle data is associated with one of safety, automated driving quality, and infotainment quality requests.

6. The optimization system of claim 1, wherein the optimization module includes instructions to determine the request handling scheme further including instructions to optimize the request handling scheme and scheduling for a service provider to satisfy one of service coverage and revenue for the vehicles associated with the edge server.

7. The optimization system of claim 1, wherein the prediction module further includes instructions to select the resources criteria according to one of vehicle flow, vehicle conditions, and edge server resources associated with the time period so that the number of computing requests and the request handling scheme satisfy actual resource requirements of the edge server.

8. A non-transitory computer-readable medium for improving execution of processing requests and including instructions that when executed by one or more processors cause the one or more processors to:

predict, using a prediction solver, a number of computing requests associated with offloading computation tasks from vehicles for execution by an edge server for a time period upcoming, wherein the prediction solver selects a prediction model from a plurality of learning models according to attributes of the edge server including service resources and information from an additional server as inputs;

determine, using an optimization solver according to a maximization formula, a request handling scheme that prioritizes remote execution of vehicle data according to the number of computing requests received from the prediction solver, the service resources, and a service area of the edge server; and communicate the request handling scheme and a resource schedule to the edge server on a condition that a resources criteria are satisfied for the time period, wherein the resource schedule identifies when to communicate a computing request for offloading to the additional server and when a first subtask partitioned from the computing request is executable on the edge server and a second subtask partitioned from the computing request is executable on the additional server according to the resources criteria.

9. The non-transitory computer-readable medium of claim 8 further including instructions that when executed by the one or more processors cause the one or more processors to partition the computing request according to satisfaction of the resources criteria and vehicle flow in the service area.

10. The non-transitory computer-readable medium of claim 9 further including instructions that when executed by the one or more processors cause the one or more processors to select the prediction model according to a substantial number of the computing requests associated with an event for the time period, wherein the prediction model is selected to satisfy one of service coverage and operator revenue.

11. The non-transitory computer-readable medium of claim 8 further including instructions that when executed by the one or more processors cause the one or more processors to adapt the optimization solver to determine the request handling scheme to satisfy the number of computing requests at the time period according to expected vehicle movement in the service area of the edge server to satisfy one of service coverage and operator revenue.

12. The non-transitory computer-readable medium of claim 8, wherein the vehicle data is associated with one of safety, automated driving quality, and infotainment quality requests.

13. The non-transitory computer-readable medium of claim 8, wherein the instructions to determine the request handling scheme further include instructions to optimize the request handling scheme and scheduling for a service provider to satisfy one of service coverage and revenue for the vehicles associated with the edge server.

14. A method of improving execution of processing requests, the method comprising:

predicting, using a prediction solver, a number of computing requests associated with offloading computation tasks from vehicles for execution by an edge server for a time period upcoming, wherein the prediction solver selects a prediction model from a plurality of learning models according to attributes of the edge server including service resources and information from an additional server as inputs;

determining, using an optimization solver according to a maximization formula, a request handling scheme that prioritizes remote execution of vehicle data according to the number of computing requests received from the prediction solver, the service resources, and a service area of the edge server; and communicating the request handling scheme and a resource schedule to the edge server on a condition that a resources criteria are satisfied for the time period, wherein the resource schedule identifies when to communicate a computing request for offloading to the additional server and when a first subtask partitioned from the computing request is executable on the edge server and a second subtask partitioned from the computing request is executable on the additional server according to the resources criteria.

15. The method of claim 14, further comprising:
partitioning the computing request according to satisfaction of the resources criteria and vehicle flow in the service area.

16. The method of claim 15, further comprising:
selecting the prediction model according to a substantial number of the computing requests associated with an event for the time period, wherein the prediction model is selected to satisfy one of service coverage and operator revenue.

17. The method of claim 14, further comprising:
adapting the optimization solver to determine the request handling scheme to satisfy the number of computing requests at the time period according to expected vehicle movement in the service area of the edge server to satisfy one of service coverage and operator revenue.

18. The method of claim 14, wherein the vehicle data is associated with one of safety, automated driving quality, and infotainment quality requests.

19. The method of claim 14, wherein determining the request handling scheme further includes optimizing the request handling scheme and scheduling for a service provider to satisfy one of service coverage and revenue for the vehicles associated with the edge server.

20. The method of claim 14, further comprising:
selecting the resources criteria according to one of vehicle flow, vehicle conditions, and edge server resources associated with the time period so that the number of computing requests and the request handling scheme satisfy actual resource requirements of the edge server.

* * * * *